United States Patent [19]

Suzuki et al.

[11] 4,054,230

[45] Oct. 18, 1977

[54] METHOD OF DETECTING A TONER CONCENTRATION

[75] Inventors: Koichi Suzuki, Yokohama; Tomoaki Suzuki, Funabashi, both of Japan

[73] Assignee: Ricoh Company, Ltd., Japan

[21] Appl. No.: 674,087

[22] Filed: Apr. 6, 1976

[30] Foreign Application Priority Data

Apr. 7, 1975 Japan .................................. 50-42512

[51] Int. Cl.[2] .......................... B67D 5/08; G03B 27/00

[52] U.S. Cl. .......................................... 222/1; 222/56; 222/DIG. 1; 118/646

[58] Field of Search .......... 222/1, 52, 56, 57, DIG. 1; 118/637; 355/3 DD

[56] References Cited

U.S. PATENT DOCUMENTS

| | | | |
|---|---|---|---|
| 3,484,022 | 12/1969 | Day | 222/DIG. 1 |
| 3,910,459 | 10/1975 | Bock et al. | 222/56 |
| 3,926,337 | 12/1975 | O'Neill et al. | 222/1 |

*Primary Examiner*—Robert R. Reeves
*Assistant Examiner*—Joseph J. Rolla
*Attorney, Agent, or Firm*—McGlew and Tuttle

[57] ABSTRACT

The method detects a toner concentration in a developer comprising a mixture of magnetic carrier particles and a non-magnetic toner through the determination of a leakage magnetic flux with a Hall element having a high sensitivity. The mixture is first shaped into a predetermined configuration and brought into a fixed magnetic field where the leakage magnetic flux is sensed by the Hall element. The shaped mixture may be a magnetic brush per se in case of the well-known magnetic brush device used. Such a Hall element is very susceptible to a variation of environmental temperature and thus requires a compensation therefor upon the determination of magnetic field. In one aspect of the invention, the compensation may be conveniently achieved by detecting a voltage across the control current terminals of the Hall element and supplying the detected result into an input of analog calculator.

4 Claims, 7 Drawing Figures

METHOD OF DETECTING A TONER CONCENTRATION

BACKGROUND OF THE INVENTION

The invention relates to a method of detecting a toner concentration in a developer which is used in a magnetic developing system.

In a magnetic developing system, an electrostatic latent image is converted into a visual image by a developer supplied thereto through magnetic means and which comprises mixture of a carrier particles of a magnetic material and a toner of a non-magnetic material. Since only the toner particles migrate to the latent image under the electrostatic interaction as the developer is supplied thereto, the toner content in the developer is gradually reduced when the developing process is repeated. However, the ratio or proportion between the toner and the carrier contained in the developer represents a controlling factor on the developing performance. If the toner component within the developer is too low as compared with the carrier component, the resulting optical density of the visual image will be insufficient, and a visual image with a low contrast will result. Conversely, if the toner content is excessively high, the toner will attach to a non-magnetic area during the developing process, producing a so-called background smearing. Therefore, it is essential, in order to achieve a proper magnetic developing process in a satisfactory manner, to maintain the ratio or proportion of the carrier and the toner contained in the developer in a proper range, by replenishing with an additional amount of toner. A proper range for the proportions of the carrier and the toner is considered to be from 3 to 5 percent by weight of the toner in the overall developer when the developer comprises a mixture of iron powder as the carrier with the toner.

It is necessary to detect the proportion of the toner relative to the carrier, or the toner concentration in the developer, in order to properly replenish the toner. Since the carrier is magnetizable while the toner is not, a change in the relative proportion of the carrier and the toner contained in the developer results in a change in the magnetic permeability thereof. Therefore, there has been proposed a method of detecting a toner concentration in a developer which comprises the steps of forming the developer into a given configuration, placing it at a given position within a magnetic field formed by a fixedly mounted magnet to thereby define a magnetic path in the developer, determining a leakage flux from the developer at another given position, and detecting toner concentration in accordance with a predetermined relationship between a change in the leakage flux and a change in the toner concentration. Under practical conditions, the above mentioned change in the leakage flux is small, on the order of several tens of Gauss, which, however, can be detected with sufficient accuracy by employing a Hall element, in particular a Hall element comprising evaporated indium antimony.

However, while the Hall element exhibits a very high sensitivity, its output is strongly dependent on the temperature, so that the magnitude of the output varies as the temperature varies, even though the strength of the magnetic field as the input remains constant, thus requiring a special temperature compensation or a thermostatic oven.

SUMMARY OF THE INVENTION

It is an object of the invention to provide a method of detecting a toner concentration which assures a precise detection of a toner concentration by the use of a Hall element, without relying on a special temperature compensation or thermostatic oven.

DETAILED DESCRIPTION OF THE PREFERRED EMBODIMENTS OF THE INVENTION

Figure 1:
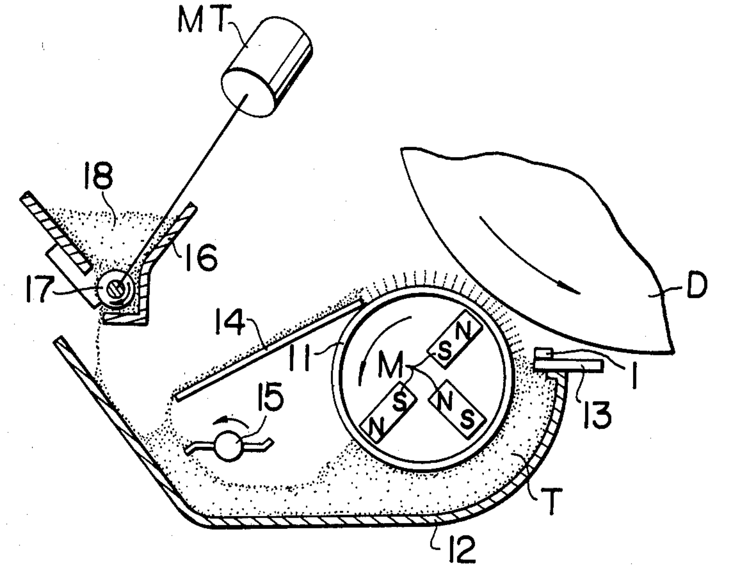
FIG. 1 is a schematic side elevation illustrating one example of a magnetic developing system.

Before describing the details of the invention, it will be useful to describe the general construction of a magnetic brush developing system, which is chosen, by way of illustration, to describe the invention. The system essentially comprises a plurality of stationary magnets M, a hollow cylindrical sleeve 11 of a non-magnetic material which surrounds the magnets, a developer tank 12 of a non-magnetic material, a doctor blade 13, a separator blade 14 and a stirring member 15.

An electrostatic latent image is formed on the peripheral surface of a drum-shaped photosensitive member D. A developer T, comprising a mixture of a toner and a magnetic carrier, is retained in the form of a brush on the peripheral surface of the sleeve 11 by the magnetic force which is produced by the magnets M. In the arrangement shown, the sleeve 11 is rotated in the counter-clockwise direction, and the brush supplies the toner to the surface of the photosensitive member which also rotates in the counter-clockwise direction, thus developing the latent image. The doctor blade 13 serves for aligning the tip ends of the brush formed by the developer. After contributing to the developing step, the developer is separated from the surface of the sleeve 11 by the separator blade 14 which is located in a region of reduced magnetic force, and then runs down the separator blade 14 to be recovered in the developer tank 12. In this manner, a fresh developer is maintained on the peripheral surface of the sleeve 11 in the form of the brush. However, as the developing step is repeated, the toner content in the developer T is reduced, and therefore a rotary slide valve 17 associated with a hopper 16 is turned in the direction of an arrow by a drive motor MT as required, thereby supplying a toner 18 contained within the hopper 16 into the developer tank 12. The fresh toner supplied is stirred within the developer 12 by the member 15.

In accordance with the invention, a Hall element 1 is disposed on the doctor blade 13. It is assumed that the element 1 is formed by evaporation of indium antimonide. The disposition of the element 1 on the blade 13 has the advantage that the uniform configuration of the developer and the consistent condition under which the element 1 determines a leakage flux from the developer, both of which are essential in order to maintain a one-to-one correspondence between the magnitude of the leakage flux and the toner concentration, are automatically satisfied, since the brush formed by the developer T has an aligned tip end which is formed by the doctor blade 13 and since the relative positions of the magnets M, sleeve 11 and the Hall element 1 are fixed. In addition, the detection of the toner concentration by the Hall element through the determination of the leakage flux corresponds to the detection of the toner concentration in the developer immediately before it is used in the developing step, so that such a detection is particularly effective in closely controlling the developing effect. However, it should be understood that the disposition of the Hall element 1 on the doctor blade 13 is not essential.

Figure 2:
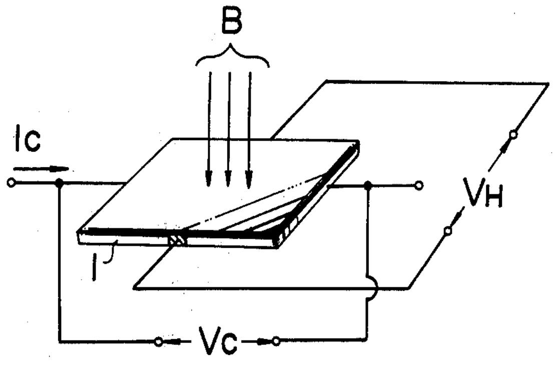
FIG. 2 is an illustration of the detection of a flux with a Hall element.

FIG. 2 illustrates the principle of determining a leakage flux with the Hall element 1. Specifically, the Hall element 1 includes control current terminals through which a control current $I_C$ is passed. The element is subjected to a leakage flux having a flux density B, as shown. As a result, a Hall voltage $V_H$ is developed across output terminals which are disposed at an angular displacement of 90° from the control current terminals. The Hall voltage $V_H$ developed may be expressed as follows:

$$V_H = K(T)BI_C \qquad (1)$$

where $K(T)$ represents a temperature coefficient which is a function of the temperature and has a value dependent on the response of the Hall element 1. It is one of the features of the invention that the Hall voltage $V_H$ is treated as a function of a plurality of variables.

Figure 3:
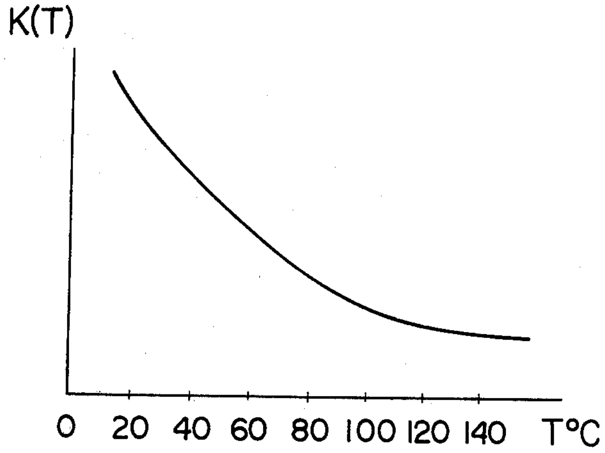
FIG. 3 graphically shows a variation of the temperature coefficient of the Hall element with temperature.

Continuing the general discussion, FIG. 3 graphically shows a variation in the magnitude of the temperature coefficient K(T) of the Hall element 1 with the temperature. The curve shown is characteristic of a particular Hall element, and may be approximated by the following quadratic function:

$$K(T) = a_0 - a_1T + A_2T^{-1} + a_3T^{-2} \qquad (2)$$

In this equation, the coefficients $a_0$, $a_1$ . . . are chosen so as to provide a best approximation for the curve shown in FIG. 3. The accuracy of approximation may be improved as required, by including terms of higher powers than two. Substitution of the equation (2) into the equation (1) yields:

$$V_H = (a_0 - a_1T + a_2T^{-1} + a_3T^{-2})\, BI_C \qquad (3)$$

This provides a value of the Hall voltage $V_H$ with the controlling accuracy of approximation of the equation (2) and in a temperature range in which the equation (2) is applicable, when flux density B, control current $I_C$ and temperature T are given. Solving the equation (3) for B, we have $$B = \frac{V_H}{(a_0 - a_1T + a_2T^{-1} + a_3T^{-2})\, I_C} \qquad (4)$$

In this manner, the leakage flus can be determined when the Hall voltage $V_H$, control current $I_C$ and the temperature T are given, with the intended accuracy of approximation, and accordingly a corresponding toner concentration in the developer T can be determined. This can be accomplished by forming an analog circuit which effects a calculation of the right-hand side of the equation (4) and supplying the necessary values of the variables thereto. The control current $I_C$ can be determined with an ammeter and the temperature T with a thermistor, with the measured values being fed as electrical signals to the analog circuit together with the Hall voltage $V_H$ measured.

Figure 4:
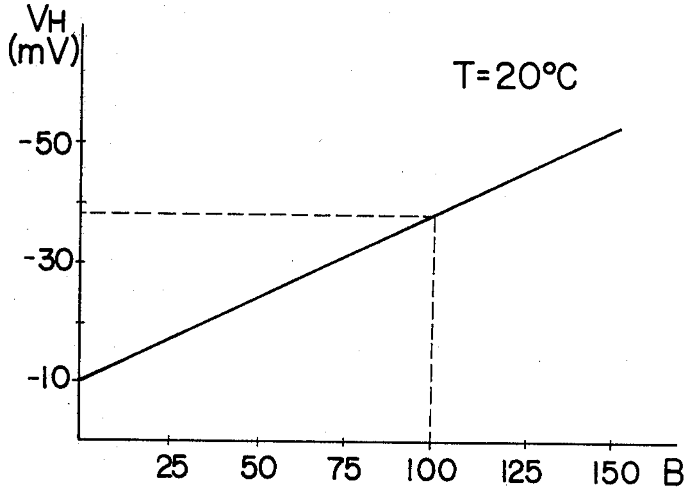
FIG. 4 graphically illustrates the relationship between the Hall voltage and the flux density.
Figure 5:
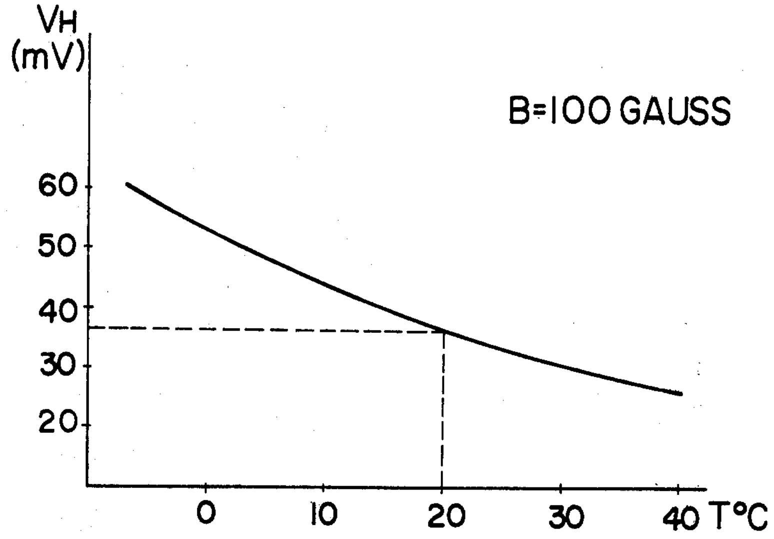
FIG. 5 graphically shows a change in the Hall voltage plotted against the temperature at a flux density of 100 Gauss.

In practical use of copying machine, it may be assumed that the temperature T of the Hall element 1 varies over a normal range of room temperature, namely, in the range from 10° to 40° C, and the flux density B of the leakage flux varies in a range from 50 to 150 Gauss. It is a simple matter to control the control current $I_C$ to be constant. Thus, the only variables appearing on the righthand side of the equation (1) are the flux density B and the temperature T. Under the conditions mentioned above, the equation (1) may be replaced by an approximation which applies in a temperature range from 10° to 40° C. Then, considering the Hall voltage $V_H$ as a function of the flux density B and the temperature T or $V_H = f_1$ (B, T), the function can be expanded into a Taylor's series about $B = B_O$ and $T = T_O$. This produces $$V_H - V_{HO} = \frac{\delta}{\delta B} f_1(B_O, T_O)(B - B_O) + \frac{\delta}{\delta T} f_1(B_O, T_O)(T - T_O) \qquad (5)$$

where $V_{HO} = f_1(B_O, T_O)$, and $(\delta/\delta B) f_1(B_O, T_O)$ represent the derivative of the function $f_1$ (B, T) with respect to B at a coordinate $(B_O, T_O)$. In summary, the equation (1) is approximated by a linear function within the temperature range described above, and such approximation is justified by the fact that in a range of variation of the room temperature, the curve shown in FIG. 3 remains substantially linear. Though the approximation (2) may be used in a range of variation of the room temperature to achieve a very high accuracy of approximation through a suitable choice of constants $a_0$ to $a_3$, an approximation by a linear function appears to be satisfactory for all practical purposes. Reference values $T_O$, $B_O$ may be chosen such that $T_O = 20°$ C and $B_O =$ 100 Gauss, and the control current $I_C$ may be maintained at a constant value of 5mA. In this instance, $V_{HO}$ has a value of −37mV. In order to determine the coefficient $(\delta/\delta)\, B\, f_1(B_O, T_O)$, the temperature T is maintained at 20° C and a change in the developed Hall voltage $V_H$ is detected while varying the flux density B. By differentiating the resulting relationship with respect to the flux density at $B = 100$ Gauss, the value of the coefficient can be determined. Such relationship is shown in FIG. 4, and it is found that $(\delta/\delta B) f_1(B_O, T_O) = -0.287$. In a similar manner, a relationship between the Hall voltage and the temperature T at flux density of 100 Gauss is obtained (see FIG. 5), and it is found that the coefficient $(\delta/\delta)\, T\, f_1(B_O, T_O) = +0.6$. Thus, the equation (5) can be rewritten into the following form:

$$V_H + 37 = -0.287(B - B_O) + 0.6(T - T_O) \qquad (6)$$

This equation is solved for B, and the resulting function can be simulated by an analog calculation circuit, to which the measured values of the Hall voltage $V_H$ and the temperature T, which may be obtained by the use of the thermistor, are supplied, thereby deriving a leakage flux B at its output. In this instance, the analog circuit comprises only addition and subtraction circuits, and therefore the general circuit arrangement will be greatly simplified.

Figure 6:
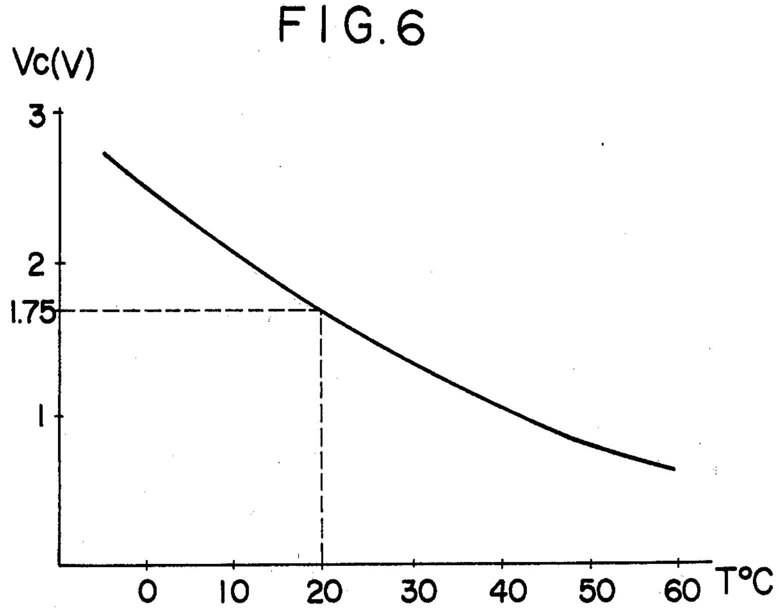
FIG. 6 graphically shows the relationship between the voltage across the control current terminals of the Hall element and the temperature.

When the control current $I_C$ through a semiconductor Hall element is maintained constant, there generally applies a simple relationship between the voltage $V_C$ across the control current terminals and the temperature T, irrespective of the magnitude of the flux density B, as illustrated in FIG. 6. The curve shown does not produce a substantial change when the flux density B is changed from 0 to 200 Gauss.

In order to eliminate the temperature T as a variable and thus dispense with a temperature determination with a thermistor, the relationship $T = h\,(V_C)$ shown in FIG. 6 may be approximated by a linear function within a range of variation of the room temperature, and the term $(T - T_O)$ appearing in the equation (6) may be represented in terms of $V_C - V_{CO}$. Thus, $$T - 20^\circ\ C = C(V_C - V_{CO}) \tag{7}$$

On the basis of FIG. 6, it is found that $V_{CO}$ 32 1.75 and $C = -1/0.0341$. Thus, $$T - 20^\circ\ C = -0.0341(V_C - 1.75) \tag{8}$$

Substituting this relationship into the equation (6), there results:

$$V_H + 37 = -0.287(B - B_O) - \frac{0.6}{0.0341}(V_C - 1.75) \tag{9}$$

When the equation (9) is solved for B and the resulting function simulated by an analog calculation circuit, the Hall voltage $V_H$ and the voltage $V_C$ across the control current terminals of the Hall element 1 may be directly supplied into the circuit to determine the prevailing fulx density.

Since the purpose of detecting the toner concentration in the developer T is to maintain the toner concentration in a proper range by suitably replenishing with an additional amount of the toner, it is more effective to detect a deviation of the toner concentration from a reference value, rather than detecting the absolute value of the toner concentration through the determination of the flux density B of the leakage flux. Thus, the equation (9) may be solved for $(B - B_O)$ or (B − 100 Gauss), and the following relationship is obtained:

$$(B - B_O) = \frac{-0.6}{0.287 \times 0.034}(V_C - 1.75) - \frac{1}{0.287}V_H - \frac{6.2}{0.287} \tag{10}$$

An analog circuit may be formed which effects the calculation of the right-hand side of the equation (10). Rearranging the equation (10 ), $$(B - B_O) = -61.32\ V_C - 3.48\ V_H - 21.60 \tag{11}$$

The analog circuit may be formed to perform the calculation represented by the equation (11).

Figure 7:
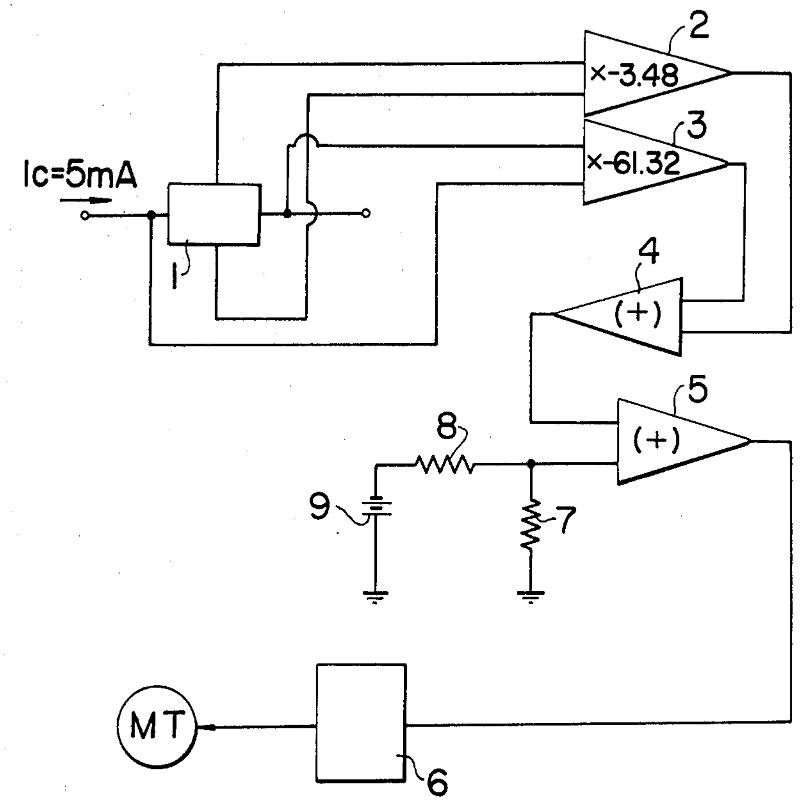
FIG. 7 is a schematic circuit diagram of a toner concentration control system incorporating the invention.

An example of the toner concentration control utilizing this technique will be described below with reference to FIG. 7. Initially, a reference toner concentration is determined, for example, to be equal to 4 percent by weight. The Hall element 1 is positioned so that the flux density sensed by it at a temperature of 20° C is equal to 100 Gauss when a developer having the determined reference toner concentration is employed. It should be understood that a control current of 5mA is passed through the Hall element 1. Then, the upper and lower limits for the proper range of the toner concentration are determined. For example, they are chosen to be equal to 4.5 and 3.5 percent by weight, respectively, and the corresponding maximum and minimum values of the flux density Bmax, Bmin are determined. Thus, a proper range of variation of $(B - B_O)$ is from Bmin − 100 to Bmax − 100. The output terminals of the Hall element 1 are connected with a differential amplifier 2, which is designed to have an amplification factor of −3.48. The control current terminals are connected to another differential amplifier 3, which is designed to have an amplification factor of −61.32. The outputs of the amplifiers 3, 4 are fed to an addition circuit 4, the output of which is fed to one input of another addition circuit 5. Another input is supplied to the addition circuit 5 from a d.c. source 9, which applies an input voltage of a magnitude which is adjusted by resistors 7, 8 to be equal to −21.60 in accordance with the constant term on the right-hand side of the equation (11). In this manner, the described components and elements form an analog calculation circuit.

An experiment has been conducted using a developer having a toner concentration of 4 percent by weight and changing the temperature in a range from 10° to 40° C. The output indicated by the analog calculation circuit always remained within a variation range of 1 Gauss from the reference value of 100 Gauss, demonstrating the effectiveness of the detection of the toner concentration in accordance with the invention.

The output of the addition circuit 5 is fed to the input of a drive motor control circuit 6 which is constructed such that it drives the drive motor MT (see FIG. 1) when the input assumes a value of Bmin − 100 and interrupts the drive when the input reaches a value of Bmax − 100. Thus, when a developer having a toner concentration of 4 percent by weight is employed to start a developing step and the toner concentration control circuit activated, the toner concentration, which decreases as the developing step is repeated, is detected by the Hall element 1 and the analog circuit, which indicates it as the density of a leakage flux. When the detected value reaches Bmin − 100, the control circuit 6 energizes the drive motor MT, which rotates the valve 17 in the hopper 16, thus causing the hopper 16 to replenish a quantity of toner 18 into the developer tank 12. It will be seen that the toner concentration in the developer which is then present on the sleeve 11 is 3.5 percent by weight. The toner 18 supplied is rapidly stirred within the developer T by the member 15, increasing the toner concentration within the developer T, so that the toner concentration in the developer which is present on the sleeve 11 will also increase. When the maximum change in the flux density or Bmax − 100 is detected, the control circuit 6 interrupts the energization of the drive motor MT, whereby the replenishment of the toner is stopped. By repeating such process, the toner concentration in the developer is maintained in a proper range. The proper range of the toner concentration which is utilized for the detection thereof is set lower than the proper range thereof in the developer tank in order to take into consideration the effect of a time lag involved until the toner supplied becomes effective.

From the foregoing description, it will be appreciated that the invention has provided a method of detecting a toner concentration in a developer with a good sensitivity and independently from a temperature change. It should be understood that the invention is not limited to a magnetic brush developing system, but is equally applicable to a magnetic developing system of cascade type.

What is claimed is:

1. A method of detecting a toner concentration in a developer comprising a mixture of a carrier particles of a magnetic material and toner of a non-magnetic material, said method comprising the steps of;

a. producing a magnetic field of a predetermined magnitude,
b. shaping said mixture into a predetermined configuration,
c. placing the shaped mixture in and at a predetermined position relative to said magnetic field,
d. locating a Hall element adjacent to and at a predetermined position relative to said so placed shaped mixture,
e. detecting the Hall voltage to provide an electric signal indicative of the magnitude thereof while passing through said Hall element a control current of a predetermined magnitude,
f. detecting the temperature at said position where said Hall element is located to provide an electric signal indicative of the magnitude thereof, and
g. supplying both said electric signals into respective inputs of an analog calculator which is designed to provide information of the toner concentration being detected in accordance with a preset calculation therein on the basis of the input electric signals.

2. The method according to claim 1, further comprising the step of replenishing said mixture with an amount of toner in accordance with said information from said analog calculator to maintain the toner concentration at a given value.

3. The method according to claim 1, wherein said temperature-detecting step comprises detecting a voltage across a pair of control current terminals of said Hall element.

4. A method according to claim 1, wherein said shaping step comprises rotating a sleeve member having a plurality of radially extending elements which surrounds a fixed magnet within a container of said mixture to form a magnetic brush carrying the mixture on the peripheral surface thereof and doctoring the magnetic brush to align the elements thereof.

* * * * *